Figure 1:
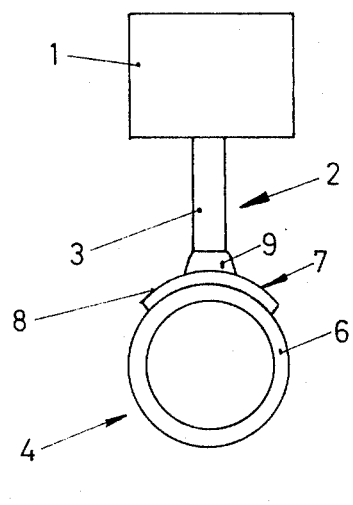

United States Patent [19]
Leffers

[11] 3,736,639
[45] June 5, 1973

[54] CONNECTING-ROD AND METHOD FOR ITS MANUFACTURE

[75] Inventor: Hans Ulrik Leffers, Augustenborg, Denmark

[73] Assignee: Danfoss A/S, Nordborg, Denmark

[22] Filed: Aug. 11, 1971

[21] Appl. No.: 170,945

Related U.S. Application Data

[62] Division of Ser. No. 864,025, Oct. 6, 1969, abandoned.

[52] U.S. Cl. ............................29/156.5 A, 74/579 R
[51] Int. Cl. .................................................B23p 15/10
[58] Field of Search.........................29/493, 427, 470, 29/156.5 R, 156.5 A; 74/579 R, 579 E, 579 F, 581, 588; 287/20 R, 23

[56] References Cited
UNITED STATES PATENTS

| | | | |
|---|---|---|---|
| 210,969 | 12/1878 | Scharfberg | 74/570 |
| 1,462,833 | 7/1923 | Soulis | 74/588 |
| 1,879,814 | 9/1932 | Morgan et al. | 29/156.5 A |

Primary Examiner—Richard J. Herbst
Assistant Examiner—D. C. Crane
Attorney—Wayne B. Eaton

[57] ABSTRACT

The invention relates to a connecting rod assembly and to a method of manufacturing the assembly. The head for the rod is cut from a length of tubing. A saddle shaped member having a bore for the connecting rod is stamped and pressed from sheet metal. The three parts, namely the head, saddle and rod, are joined metallurgically in a soldering furnace after soldering material is added.

1 Claim, 2 Drawing Figures

PATENTED JUN 5 1973 3,736,639

CONNECTING-ROD AND METHOD FOR ITS MANUFACTURE

This is a division, of appln. Ser. No. 864,025, filed 10-6-69, now abandoned.

The invention relates to a connecting-rod, in which a shaft is connected to an eccentric crank bearing head, manufactured separately therefrom, and to a method for its manufacture.

A connecting-rod is known in which a shaft of steel bar material is connected to a crank bearing head which is made of cast iron and the cylindrical bore of which is eccentrically offset relatively to the cylindrical outer circumference in such manner that a greater wall thickness is provided on the side facing the shaft than on the opposite side. This eccentric arrangement results in saving of weight. A bore extending over part of the wall-thickness is provided in the zone of the thicker wall for accommodating the shaft. Shaft and head are connected by soldering.

This method of making the connection however has its problems. Cast iron and other materials that can be used for the eccentric head cannot be readily soldered. A material such as steel that is more readily soldered is not however available in such eccentric form. Furthermore, the provision of the bore for accommodating the shaft calls for an additional machining operation on the casting.

The object of the invention is to provide a connecting-rod having the known advantages but which can be manufactured considerably more easily and cheaply.

This object is achieved by making the head of the connecting-rod from a length of tube and from a shaped sheet-metal part which is attached to part of the periphery of the length of tube and contains a hole for accommodating the shaft.

In this arrangement, although the head consists of two parts, these can nevertheless both be made in a readily solderable material and can be joined together without difficulty during the soldering operation required for fitting the shaft. The shaped sheet-metal part can be produced in one stamping and bending operation, the hole for accommodating the shaft being provided at the same time. Last, but not least, it is even possible to achieve further saving in weight in this manner.

The shaft will hold even more firmly in the head if the shaped sheet-metal part incorporates a collar surrounding the hole.

According to the invention, a very simple method for manufacturing such a connecting-rod, in which all the parts are accurately aligned with each other, consists in first attaching the shaft by its end-face to the length of tube by welding or the like, thereby aligning the shaft as required, and in then soldering the shaped sheet-metal parts to these two parts.

Figure 2:
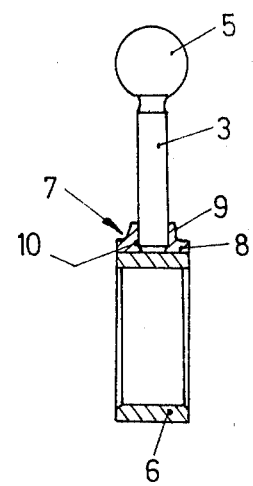

The invention will now be described in more detail by reference to an embodiment illustrated in the drawing, in which:

FIG. 1 is a side view of the connecting-rod of the invention with the piston fitted, and FIG. 2 is a longitudinal section through the connecting rod.

A piston 1 is linked to a connecting-rod 2. The latter consists of a shaft 3, having at its lower end a crank bearing head 4 and at its upper end a ball 5 engaged by a hemispherical shell, not illustrated, on the piston 1. The head 4 consists of a length 6 of tube and a saddle shaped sheet-metal part 7. The latter consists of a base portion 8, of part-cylindrical form, contiguous with the length 6 of tubing, and of a collar 9 which surrounds a hole 10 for accommodating the shaft 3.

In manufacturing the connecting-rod, the length 4 is cut off from a tube and, if necessary, internally machined. The shaped sheet-metal part is stamped and pressed in one operation. The shaft is cut off from a piece of bar material and is welded to a standard steel ball. The shaped sheet-metal part is then pushed over the shaft 3, and the shaft is attached by its end-face to the length 4 of tubing, by welding. Finally, the shaped sheet-metal part is placed in position, soldering material being added, and the whole assembly is then passed through a soldering furnace, the correct position of the shaft being ensured by the preceding welding.

I claim:

1. A method for manufacturing a connecting rod assembly comprising the steps of forming an annularly shaped bearing having cylindrically shaped internal and external surfaces, forming said internal surface to engage a crankshaft journal, forming a saddle shaped member with an aperture for a shaft and a lower surface conforming in shape to said external surface of said bearing, inserting a shaft into said aperture and attaching the end face of said shaft to said external bearing surface by welding, attaching said saddle shaped member to said bearing by placing said lower surface in abutting engagement with said bearing external surface and applying a metallurgical joining process to said abutting surfaces.

* * * * *